Patented Apr. 15, 1924.

1,490,728

UNITED STATES PATENT OFFICE.

EMILE BINDSCHEDLER, OF LANSDOWNE, PENNSYLVANIA, ASSIGNOR TO TUBIZE ARTIFICIAL SILK COMPANY OF AMERICA, A CORPORATION OF DELAWARE.

PROCESS FOR THE RECOVERY OF AMMONIA AND OTHER VALUABLE CHEMICALS FROM WASTE DENITRATION LIQUORS.

No Drawing.        Application filed June 2, 1923. Serial No. 643,086.

*To all whom it may concern:*

Be it known that I, EMILE BINDSCHEDLER, a citizen of the Republic of Switzerland, residing in Lansdowne, county of Delaware, in the State of Pennsylvania, have invented certain new and useful Improvements in Processes for the Recovery of Ammonia and Other Valuable Chemicals from Waste Denitration Liquors, of which the following is a true and exact description.

My invention relates to the recovery of valuable chemicals from waste liquors, resulting from the process of denitrating nitrocellulose silk with sodium sulfhydrate. These waste liquors contain sodium polysulphides, some unchanged sodium sulfhydrate and a small amount of thiosulphate as sulphur compounds, sodium nitrite and ammonia as nitrogen compounds.

The object of my invention is by a simple and inexpensive process to recover from waste liquors resulting from the denitration of nitrocellulose silk with sodium sulfhydrate, ammonia and other valuable chemicals including, by preference, sodium sulfhydrate in condition to be used for denitration. I am aware that it has been proposed to treat waste liquors resulting from the denitration of nitrocellulose silk by calcium sulfhydrate with carbonic acid whereby hydrogen sulphide gas is recovered from unchanged calcium sulfhydrate and to separate from the remaining liquors nitrite and thiosulphate by concentration and fractional crystallization. I have discovered, however, that where carbon dioxide is used to treat waste liquors resulting from the denitration of nitrocellulose silk by sodium sulfhydrate the reactions proceed in an entirely different way and that a larger recovery of ammonia is made possible, and primarily my invention consists in the process of treating the denitrated waste liquors resulting from the denitration by sodium sulfhydrate with carbon dioxide and the recovery of ammonia and other valuable chemicals from the waste liquor resulting from this treatment, by preference, carrying the process forward as hereafter described so as to recover sodium sulfhydrate in condition for reuse.

My process may be described as follows: I introduce into the waste liquors resulting from the denitration of nitrocellulose silk by sodium sulfhydrate, which I first heat to a temperature of from 60° C. to 80° C., carbon dioxide gas, as a result of which practically no hydrogen sulphide gas is evolved but sulphur is precipitated out and the color of the liquor changes from dark red to a very light yellow.

The reaction which is preferably carried out at about 80° C. seems to proceed along the lines as shown by the following equations with the ultimate result of a final conversion of the nitrite into ammonium carbonate, which upon treatment with milk of lime sets the ammonia free, which can be condensed or converted into ammonium sulphate:

1. $2NaSH + H_2O + CO_2 = Na_2CO_3 + 2H_2S$
2. $Na_2S_3 + H_2O + CO_2 = Na_2CO_3 + S_2 + H_2S$
3. $NaNO_2 + 3H_2S =$

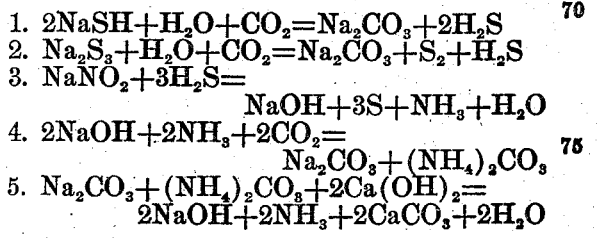

After separating of the precipitated calcium carbonate, which is used to generate carbonic acid, by reaction with nitrecake or waste sulphuric acid, the remaining mother liquor containing mostly caustic soda and some sodium thiosulphate is treated with nitrecake to produce sodium sulphate, which upon filtering from some precipitated sulphur, crystallizes out upon concentration and cooling of the liquor. The sodium sulphate and the calcium sulphate obtained according to equations 6 and 7 can be reduced with coal, according to well known methods, to a mixture of sodium sulphide and calcium sulphide. Upon leaching with water, the sodium sulphide enters in solution and is separated by filtration from the calcium sulphide and converted into sodium sulphydrate by treating it with hydrogen sulphide gas generated from the calcium sulphide by treatment with waste sulphuric acid or nitrecake (equations 9 and 10)

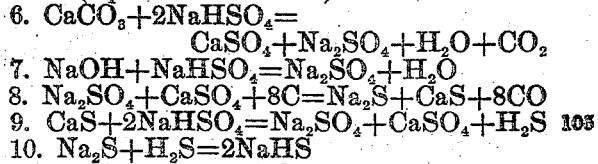

In this way a complete cycle is produced between the treatment of the waste liquors and the manufacture of sodium sulfhydrate, the materials used being only cheap or valueless by-products like nitre-cake and denitration waste liquors, the only material to be purchased being coal, while the chemicals obtained, ammonium sulphate and sulphur are of substantial value.

Having now described my invention, what I claim as new and desire to secure by Letters Patent, is:

1. Process for the treatment of waste liquors from denitration of nitrocellulose silk with sodium sulfhydrate, which consists in heating said liquors, treating said heated liquors with carbonic acid, removing the sulphur precipitated out, treating the remaining liquor with lime, and driving off and recovering ammonia.

2. Process for the treatment of waste liquors from denitration of nitrocellulose silk with sodium sulfhydrate, which consists in heating said liquors, treating said heated liquors with carbonic acid, removing the sulphur precipitated out, treating the remaining liquor with lime, driving off and recovering ammonia, filtering off the calcium carbonate and adding nitrecake to the remaining mother liquor to produce sodium sulphate.

3. Process for the treatment of waste liquors from denitration of nitrocellulose silk with sodium sulfhydrate, which consists in heating said liquors, treating said heated liquors with carbonic acid, removing the sulphur precipitated out, treating the remaining liquor with lime, driving off and recovering ammonia, filtering the precipitated calcium carbonate, treating the latter with nitrecake to generate carbonic acid to be used for the carbonation of the waste liquors, adding nitrecake to the alkaline mother liquor, to produce sodium sulphate and recovering the latter by concentration and cooling.

EMILE BINDSCHEDLER.